UNITED STATES PATENT OFFICE.

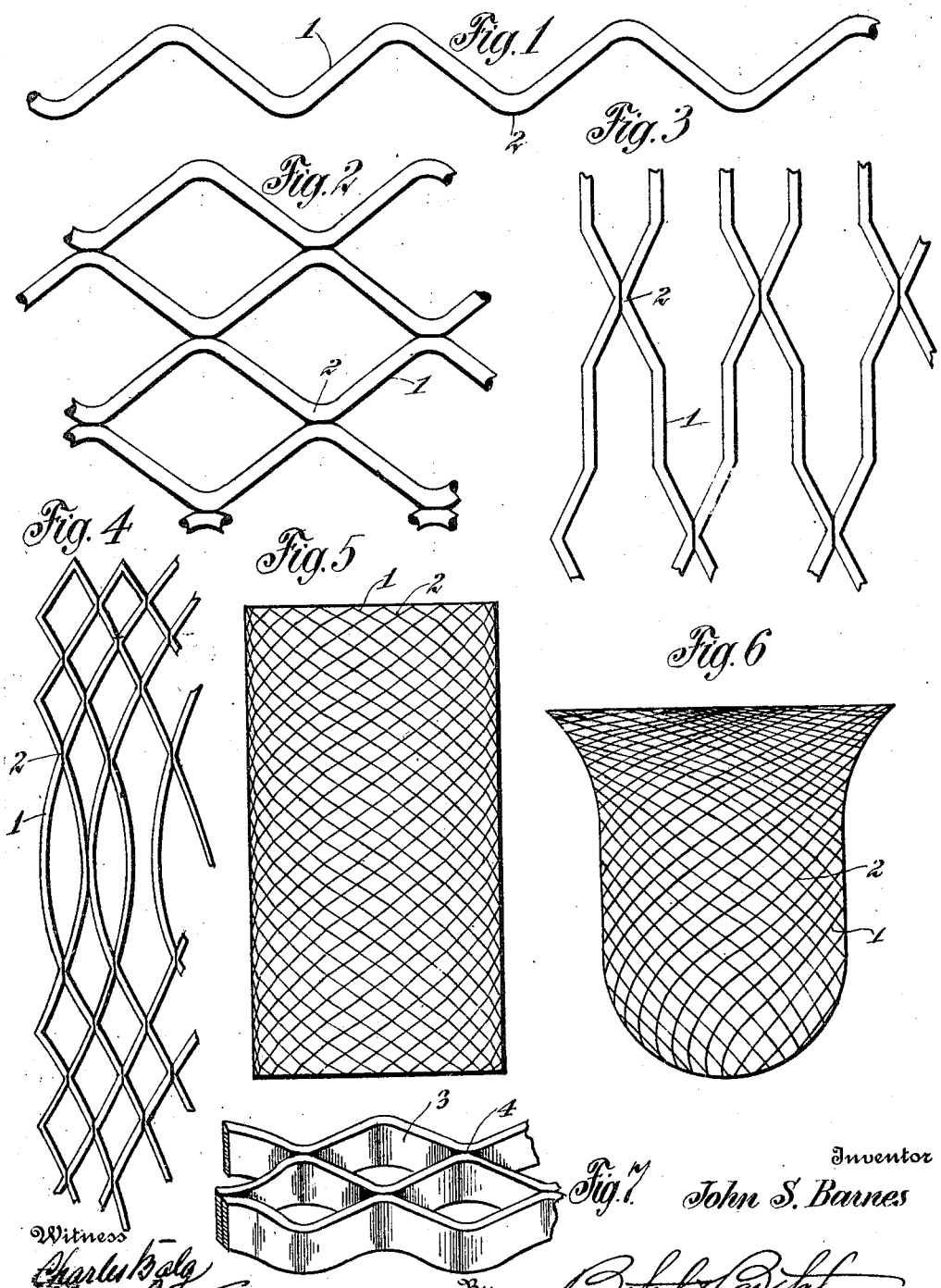

JOHN S. BARNES, OF DETROIT, MICHIGAN.

PRODUCTION OF ARTICLES FROM WIRE FABRIC.

1,324,024.  Specification of Letters Patent.  Patented Dec. 9, 1919.

Application filed June 21, 1917. Serial No. 176,020.

*To all whom it may concern:*

Be it known that I, JOHN S. BARNES, a citizen of the United States of America, residing at Detroit, in the county of Wayne and State of Michigan, have invented certain new and useful Improvements in the Production of Articles from Wire Fabric, of which the following is a specification, reference being had therein to the accompanying drawings.

This invention relates to the production of articles from wire fabric.

My invention aims to provide a wire fabric made of strands of wire bent or shaped to provide a desired weave or mesh when the strands of wire are connected together. In the manufacture of ordinary wire fabric, it is the present practice to actually weave strands of wire to provide interstices of a desired shape and in weaving, the wires are interwoven and cross one another, such work being ordinarily performed in a loom or weaving machine. It is in this connection, that my invention aims to provide a wire fabric having all of the wires, at their juncture, in a common plane, and this is accomplished by electrically welding confronting faces or portions of wire that have been previously bent and shaped. By such a process of manufacture, it is possible to produce wire fabric having an appearance as though cast, as the strands of wire are made integral instead of being interwoven. With such a piece of fabric it is possible to distend one portion thereof and retract another portion, particularly when the piece of fabric is in cylindrical form and it is desired to produce a basket or container having a flared mouth and a closed or contracted bottom.

My invention will be hereinafter described and then claimed, and reference will now be had to the drawing, wherein Figure 1 is a plan of a piece of wire bent and shaped to be used in connection with a piece of fabric;

Fig. 2 is a plan of a piece of fabric made of pieces of wire such as shown in Fig. 1;

Figs. 3 and 4 are plans of pieces of fabric of different design;

Fig. 5 is an elevation of a cylinder formed from a piece of fabric in accordance with this invention;

Fig. 6 is an elevation of a wire fabric cylinder shaped to conform to a flower basket, and Fig. 7 is a perspective view of metallic fabric made of strips or ribbons of metal.

In Figs 1 to 4 inclusive, 1 denotes strands or pieces of wire bent and shaped to provide welding portions 2 which will contact with similar portions of adjoining pieces of wire, when the wires are placed in a common plane to provide interstices of desired configuration. Considering Figs. 1 and 2, it will be noted that the pieces of wire in Fig. 2 are in a common plane and the welding portions 2 thereof contact. With the wires in such a plane, the welding portions 2 can be electrically welded or brazed to permanently join the pieces of wire and provide practically a homogeneous mass in the piece of fabric. With the pieces of wire welded in this manner, it is possible to bend and shape a piece of fabric as the interstices may be distended or retracted in the formation of an article. As an instance of articles that may be produced from fabric in accordance with my invention, there is illustrated in Fig. 5 a cylinder of wire fabric and the bottom of the cylinder may be closed by a flat piece of fabric to provide a waste basket. A cylinder similar to that shown in Fig. 5 may have the upper end thereof reamed or otherwise operated upon to distend and flare the end of the cylinder to form a mouth, while the lower end of the cylinder may be contracted and closed, thus providing a wire flower hanger basket. With the wires electrically welded and joined in a common plane such an article will present a neat and attractive appearance and possess even greater durability than ordinary woven wire and with strips of the welded fabric used for fencing it is possible to provide nicely rounded corners and distended upper and lower edges in connection with a fence and at the same time retain a degree of rigidity equal to that of grating.

Fabric as herein described can be advantageously used as partition screens, window guards, tree boxes, trellis cages and for many purposes requiring durable, as well as artistic lattice work.

As a further example of metallic fabric, there is shown in Fig. 7, strips or ribbons 3 of metal joined, as at 4, thus providing a rigid and more durable fabric than that made of wire.

As will be understood, in the production of each of such structures the fabric is initially produced by welding spaced portions of strands of proper configuration and this fabric then formed into an embryo mesh-like structure in which the mesh formations are substantially as in the fabric. The article is then completed by distorting predetermined portions of the fabric or mesh formations—by distending or contracting action—thus permitting the shape to be provided by changing the mesh shapes and producing a rigid formation of the desired shape.

What I claim is:—

1. A process of making articles from wire fabric consisting of adjoining strands of wire by electric welding to maintain all of the wires in a common plane, to form a piece of fabric, then bending the piece of fabric to cylindrical form and electrically welding the abutting edges of the fabric, and then distending and contracting ends of the cylinder.

2. The method of producing articles from wire fabric, which consists in producing an embryo-mesh-like structure from strands welded together at spaced meeting faces, and then shaping the embryo structure to complete the article by distorting predetermined mesh formations of the embryo structure.

In testimony whereof I affix my signature in the presence of two witnesses.

JOHN S. BARNES.

Witnesses:
ANNA M. DORR,
G. E. McGRANN.